Jan. 5, 1971        W. A. BATSON        3,552,015
BLADE GUARDS FOR HEDGE TRIMMERS
Filed June 24, 1968
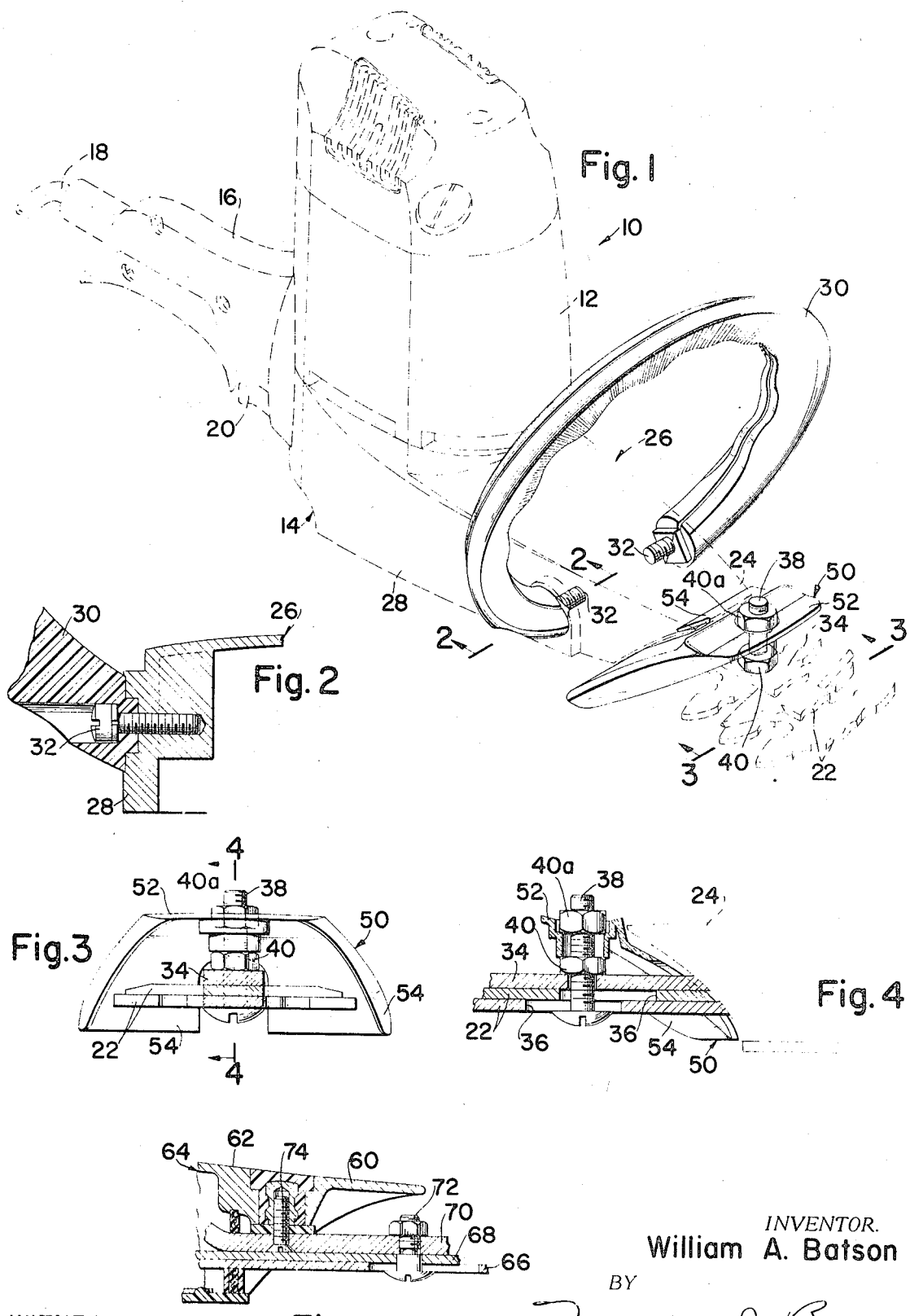
INVENTOR.
William A. Batson
BY Marshall J. Breen
ATTORNEY
WITNESS:
Heidi Schleehauf $$\text{3,552,015}$$
BLADE GUARDS FOR HEDGE TRIMMERS
William A. Batson, Pickens, S.C., assignor to The Singer Company, New York, N.Y., a corporation of New Jersey
Filed June 24, 1968, Ser. No. 739,343
Int. Cl. B26b 29/00
U.S. Cl. 30—216                                                                 1 Claim

ABSTRACT OF THE DISCLOSURE

This disclosure relates to hand held hedge trimmer in which a blade guard is either integrally formed with the housing of the tool or connected thereto to extend over the cutting blades as the cutting blades emerge from the housing and thus shield the operator's hand from coming into accidental contact with the cutting teeth thereof.

BACKGROUND OF THE INVENTION

Heretofore the cutting blades of a hedge trimmer extended from an end of the housing of the tool in an unguarded manner. Of course, the closer a handle was located to the end of said housing the more hazardous it was for the operator. This is especially true due to an increased popularity and use of the bail-type handles which are connected to the housing usually within a finger's length of said housing end.

SUMMARY OF THE INVENTION

In accordance with the present invention the novel blade guard is embodied in a hedge trimmer which has a motor mounted in a housing and is connected to drive cutting blades which extend outwardly of the housing. A handle is connected to the housing in spaced relationship with the point thereof from which the cutting blades extend. A blade guard is supportably connected at the point of the housing from which the cutting blades extend. The blade guard is positioned over the cutting blades a short distance to shield the cutting teeth thereof and prevent accidental contact therewith on the operator grasping said handle.

It is therefore an object of the present invention to provide a blade guard for a hedge trimmer to overcome the prior art deficiencies; which is simple, economical and reliable; which does not interfere with the normal movement of the cutting blades; which is transparent; which is plastic, which is made of a transparent plastic; which is slotted to straddle the cutting blade assembly; which forms a shield between the handle and the cutting blades; which is connected to the housing adjacent the location in which the cutting blades exit from said housing; and, which is used in combination with a bail-type handle.

BRIEF DESCRIPTION OF THE DRAWINGS

This invention is illustrated in the accompanying drawings in which:

FIG. 1 is a perspective view, partly in phantom, of a hedge trimmer having a bail-type handle and a novel blade guard.

FIG. 2 is a view taken along line 2—2 of FIG. 1.

FIG. 3 is a view taken along line 3—3 of FIG. 1.

FIG. 4 is a view taken along line 4—4 of FIG. 1.

FIG. 5 is an elevational view partly in section of another form of the present invention showing an integrally formed blade guard.

DESCRIPTION OF THE INVENTION

In the embodiment of the present invention shown in FIGS. 1–4 a conventional hedge trimmer 10 is illustrated in FIG. 1.

The hedge trimmer 10 includes a motor housing 12 which is connected at the bottom thereof to a gear housing 14. A main handle 16 is connected on one side of the housings 12 and 14 and has a cord 18 disposed therein to be suitably connected in circuit with a switch 20 and a motor (not shown) which is operated upon actuation of the switch 20 in the usual manner.

The motor is mounted in the motor housing 12 and adapted to drive a pair of cutting blades 22 through a gear train (not shown) carried within the gear housing 14.

The blades 22 extend from the narrow end 24 of a tapered front projection 26 which is formed as a part of the gear housing 14, and extends outwardly from the motor housing 12 on the side thereof remote from the handle 16.

The front projection 26 has vertical side walls 28 as shown in FIGS. 1 and 2, to which is connected either end of a bail-type handle 30 by screws 32. The bail-type handle 30 is connected to the front projection 26 intermediate the end 24 thereof and the motor housing 12, but usually within six inches of the end 24.

A longitudinal support bar 34 is mounted within the housing of the hedge trimmer 10 in a stationary manner, and provides support for the cutting blades 22 which are connected thereto. The cutting blades 22 described in the present embodiment of the invention, may be termed "double acting" in that they alternately are driven toward and away from each other. At the support points the cutting blades 22 have longitudinally elongated aligned slots 36 through which a large headed screw 38 passes to threadedly receive a nut 40 which clamps the cutting blades 22 to the support bar 34, as illustrated in FIGS. 3 and 4. Thus, the cutting blades 22 are suitably supported so as not to interfere with their cutting action.

The end 24 that the cutting blades 22 exit the housing of the hedge trimmer 10 is a hazardous location in that it is within easy finger reach of the operator whose hand may stray from one or the other of the handles, and if not otherwise prevented, come into contact with the cutting blades 22. To prevent this, a novel blade guard 50 is provided adjacent the end 24 of the housing of the hedge trimmer, 10.

The blade guard 50, illustrated in FIGS. 1, 3 and 4, is made of a transparent polycarbonate or other suitable plastic or metal material. The blade guard 50 may be formed as an inverted U with the base 52 having a central countersunk aperture for mounting thereof and through which the screw 38 passes for a nut 40a to be threadedly secured onto the blade guard. A pair of legs 54 straddle the support bar 34 and extend below the cutting blades 22 and slightly outwardly therefrom as shown in FIG. 3, thereby forming a shield between said cutting blades and the handle 30. The legs 54 are inclined downwardly and away from the mounting screw 38 to follow the general contour of the housing end 24 as illustrated in FIGS. 1 and 4. The blade guard 50 enables the use of a streamlined light weight housing not otherwise possible while providing a broad shield to prevent accidental operator contact with the cutting blades 22.

In the embodiment of the present invention illustrated in FIG. 5 the blade guard 60 is formed integrally with the end 62 of the housing 64 of a hedge trimmer. In this embodiment a single acting cutter blade 66 is used in combination with a stationary cutter blade 68 suitably supported by a longitudinal support bar 70 by screw means 72 in a manner similar to that described hereinbefore. Additional screw means 74 is shown which threadedly mounts the support bar 70 to the housing end 62.

The blade guard 60 cantilevers over the screw means 72 to provide a suitable shield for the cutting blades 66 and 68, and may be made suitably broad to overlap the cutting teeth thereof.

It will be understood that various changes in the details, materials, arrangements of parts and operating conditions which have been herein described and illustrated in order to explain the nature of the invention may be made by those skilled in the art within the principles and scope of the invention as expressed in the claim.

I claim:
1. A hand-held electric portable hedge trimmer comprising:
  (a) a motor housing having a motor therein;
  (b) a gear housing below said motor housing;
  (c) a tapered front projection formed as part of said gear housing;
  (d) a pair of reciprocating cutting blades having a plurality of cutting teeth, driven by the motor and extending horizontally outwardly from said tapered front projection of said gear housing;
  (e) a main handle extending rearwardly outwardly from said gear housing;
  (f) a bail handle looping over said gear housing mounted on the tapered front projection of said gear housing between said motor housing and said cutting blades;
  (g) a stationary support bar connected to the gear housing extending parallel to and interconecting with said cutting blades;
  (h) a transparent blade guard mounted between said bail handle and said cutting blades at a point above where the cutting blades extend outwardly from said tapered front projection of said gear housing;
  (i) means connecting the blade guard to the support bar adjacent the point of the gear housing from which the cutting blades extend;
  (j) the blade guard being an inverted U-shaped member with a base and a pair of depending legs;
  (k) the legs straddling the cutting blades and spaced outwardly therefrom, tapering outwardly from said base and extending below said cutting blades, and
  (l) the blade guard cantilevered over the cutting blades a short distance to cover the cutting teeth thereof and prevent accidental contact therewith by an operator grasping said bail handle.

References Cited

UNITED STATES PATENTS

| 2,627,657 | 2/1953 | Etchen | 30—286X |
| 2,652,626 | 9/1953 | Dutcher | 30—233X |
| 2,675,835 | 4/1954 | Kiekhaefer | 143—32 |
| 2,990,614 | 7/1961 | Taggart | 30—272 |
| 3,009,246 | 11/1961 | Witherby | 30—286X |
| 3,230,987 | 1/1966 | Wolesagle | 143—159X |
| 3,372,481 | 3/1968 | Skinner | 30—233X |
| 3,431,647 | 3/1969 | Scott | 30—216X |

ROBERT C. RIORDON, Primary Examiner

J. C. PETERS, Assistant Examiner

U.S. Cl. X.R.

30—295